United States Patent
Guler et al.

(10) Patent No.: US 11,650,152 B2
(45) Date of Patent: May 16, 2023

(54) CALIBRATION OF AN OPTICAL DETECTOR

(71) Applicant: Carrier Corporation, Palm Beach Gardens, FL (US)

(72) Inventors: Urcan Guler, Avon, CT (US); David L. Lincoln, Cromwell, CT (US); Marcin Piech, East Hampton, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/059,944

(22) PCT Filed: Nov. 27, 2019

(86) PCT No.: PCT/US2019/063517
§ 371 (c)(1),
(2) Date: Nov. 30, 2020

(87) PCT Pub. No.: WO2020/123155
PCT Pub. Date: Jun. 18, 2020

(65) Prior Publication Data
US 2021/0372922 A1    Dec. 2, 2021

Related U.S. Application Data

(60) Provisional application No. 62/778,113, filed on Dec. 11, 2018.

(51) Int. Cl.
*G01N 21/53* (2006.01)
*G08B 17/107* (2006.01)

(52) U.S. Cl.
CPC .......... *G01N 21/53* (2013.01); *G08B 17/107* (2013.01); *G01N 2201/127* (2013.01)

(58) Field of Classification Search
CPC .............. G01N 21/274; G01N 21/53; G01N 2201/127; G08B 17/107; G08B 29/145; G08B 29/22
USPC ............ 356/3.04, 3.06, 3.07, 3.08, 34, 35.5, 356/141.4, 400, 411, 435, 442, 444, 222, 356/226, 337–343, 250
See application file for complete search history.

(56) References Cited

U.S. PATENT DOCUMENTS

| 3,585,621 A | 6/1971 | Dicello et al. |
| 3,693,401 A | 9/1972 | Purt et al. |

(Continued)

FOREIGN PATENT DOCUMENTS

| CN | 2182407 U | 11/1994 |
| CN | 2462380 U | 11/2001 |

(Continued)

OTHER PUBLICATIONS

JK Exports Defusing Dangers—Solo Detector Testers. Smoke Detector Testing. Retrieved from https://jkexportsindia.co.in/detector-testers?gclid=EAIaIQobChMI_-X6w62o3QIVIY2PCh1dpA5PEAAYASAAEgLKm_D_BwE. Date Accessed: Sep. 19, 2018. 9 Pages.

(Continued)

*Primary Examiner* — Tri T Ton
(74) *Attorney, Agent, or Firm* — Cantor Colburn LLP

(57) ABSTRACT

A method of calibrating an optical detector includes affixing a calibration material to a first surface of the optical detector and calibrating one or more parameters of the optical detector using the calibration material.

18 Claims, 8 Drawing Sheets

(56) References Cited

U.S. PATENT DOCUMENTS

| | | | |
|---|---|---|---|
| 3,949,234 A * | 4/1976 | Vandermark | G01N 21/534 340/630 |
| 4,099,178 A | 7/1978 | Ranney et al. | |
| 4,249,244 A | 2/1981 | Shofner et al. | |
| 4,306,575 A | 12/1981 | Minozzi, Jr. | |
| 4,870,394 A | 9/1989 | Corl et al. | |
| 5,123,738 A | 6/1992 | Yonemura | |
| 5,413,915 A | 5/1995 | Case et al. | |
| 5,473,314 A | 12/1995 | Mochizuki et al. | |
| 5,497,144 A | 3/1996 | Schappi et al. | |
| 5,670,946 A | 9/1997 | Ellwood et al. | |
| 6,396,405 B1 | 5/2002 | Bernal et al. | |
| 6,692,916 B2 | 2/2004 | Bevilacqua et al. | |
| 7,111,496 B1 | 9/2006 | Lilienfeld et al. | |
| 7,167,098 B2 | 1/2007 | Siber et al. | |
| 7,212,734 B2 | 5/2007 | Pepper et al. | |
| 7,224,284 B2 | 5/2007 | Mi et al. | |
| 7,587,926 B2 | 9/2009 | Ackerman | |
| 7,616,126 B2 | 11/2009 | Kadwell et al. | |
| 8,205,478 B1 | 6/2012 | Hallisey | |
| 8,896,835 B2 | 11/2014 | Ido et al. | |
| 8,937,718 B2 | 1/2015 | Sieg et al. | |
| 9,183,737 B1 | 11/2015 | Billman | |
| 9,652,958 B2 | 5/2017 | Zribi et al. | |
| 2001/0038338 A1 | 11/2001 | Kadwell et al. | |
| 2003/0001746 A1 | 1/2003 | Bernal et al. | |
| 2006/0007010 A1 * | 1/2006 | Mi | G08B 29/20 340/630 |
| 2009/0075248 A1 | 3/2009 | Debreczeny et al. | |
| 2009/0188296 A1 | 7/2009 | D'Amico et al. | |
| 2010/0315638 A1 | 12/2010 | Goohs et al. | |
| 2012/0140231 A1 | 6/2012 | Knox et al. | |
| 2012/0242993 A1 | 9/2012 | Schick et al. | |
| 2018/0149578 A1 | 5/2018 | Walls et al. | |
| 2018/0275052 A1 * | 9/2018 | Walsh | G01N 21/645 |
| 2019/0346356 A1 | 11/2019 | Karnik et al. | |
| 2021/0302311 A1 | 9/2021 | Guler et al. | |
| 2021/0364422 A1 | 11/2021 | Guler et al. | |

FOREIGN PATENT DOCUMENTS

| | | |
|---|---|---|
| CN | 102998425 A | 3/2013 |
| CN | 103514723 A | 1/2014 |
| CN | 104637234 A | 5/2015 |
| CN | 105938649 A | 9/2016 |
| CN | 107543613 A | 1/2018 |
| DE | 102009046556 A1 | 5/2011 |
| EP | 1376506 A1 | 1/2004 |
| EP | 2600139 A1 | 6/2013 |
| EP | 2846150 A1 | 3/2015 |
| EP | 2873964 A1 | 5/2015 |
| GB | 2095821 A | 10/1982 |
| GB | 2283727 B | 5/1995 |
| GB | 2557246 A | 6/2018 |
| JP | 2006024064 A | 6/2005 |
| JP | 5167047 B2 | 3/2013 |
| JP | 6266047 B2 | 1/2018 |
| KR | 101736765 B1 | 5/2017 |
| WO | 9502230 A1 | 1/1995 |
| WO | 2008111895 A1 | 9/2008 |
| WO | 2017060716 A1 | 4/2017 |
| WO | 2018069473 A1 | 4/2018 |

OTHER PUBLICATIONS

Killeen et al. "Alternative Calibration Process for Optical Smoke Detectors", Aug. 23, 2012, Worcester Polytechnic University, 57 pages.

International Preliminary Report on Patentability; International Application No. PCT/US2019/063517; International Filing Date Nov. 27, 2019; dated Jun. 24, 2021; 9 pages.

International Preliminary Report on Patentability; International Application No. PCT/US2019/063522; International Filing Date Nov. 27, 2019; dated Jun. 24, 2021; 10 pages.

International Preliminary Report on Patentability; International Application No. PCT/US2019/064902; International Filing Date Dec. 6, 2019; dated Jun. 24, 2021; 9 pages.

International Search Report of the International Searching Authority; International Application No. PCT/US2019/063517; International Filing Date: Nov. 27, 2019; dated Feb. 28, 2020; 4 pages KU301900PCT).

International Search Report of the International Searching Authority; International Application No. PCT/US2019/063522; International Filing Date: Nov. 27, 2019; dated Feb. 28, 2020; 6 pages.

International Search Report of the International Searching Authority; International Application No. PCT/US2019/064902; International Filing Date: Dec. 6, 2019; dated Mar. 9, 2020; 6 pages.

Written Opinion of the International Searching Authority; International Application No. PCT/US2019/063517; International Filing Date: Nov. 27, 2019; dated Feb. 28, 2020; 7 pages.

Written Opinion of the International Searching Authority; International Application No. PCT/US2019/063522; International Filing Date: Nov. 27, 2019; dated Feb. 28, 2020; 10 pages.

Written Opinion of the International Searching Authority; International Application No. PCT/US2019/064902; International Filing Date: Dec. 6, 2019; dated Mar. 9, 2020; 9 pages.

U.S. Non-Final Office Action; U.S. Appl. No. 17/059,940; Filing Date: Nov. 30, 2020; dated Jan. 7, 2022; 25 pages.

U.S. Final Office Action; U.S. Appl. No. 17/059,940; dated May 6, 2022; 11 pages.

U.S. Non-Final Office Action; U.S. Appl. No. 15/734,120; dated Apr. 11, 2022; 27 pages.

U.S. Final Office Action; U.S. Appl. No. 15/734,120; dated Aug. 30, 2022; 19 pages.

U S. Non-Final Office Action; U.S. Appl. No. 15/734,120; dated Nov. 22, 2022; 15 pages.

U.S. Non-Final Office Action; U.S. Appl. No. 17/059,940; dated Jul. 27, 2022; 12 pages.

* cited by examiner

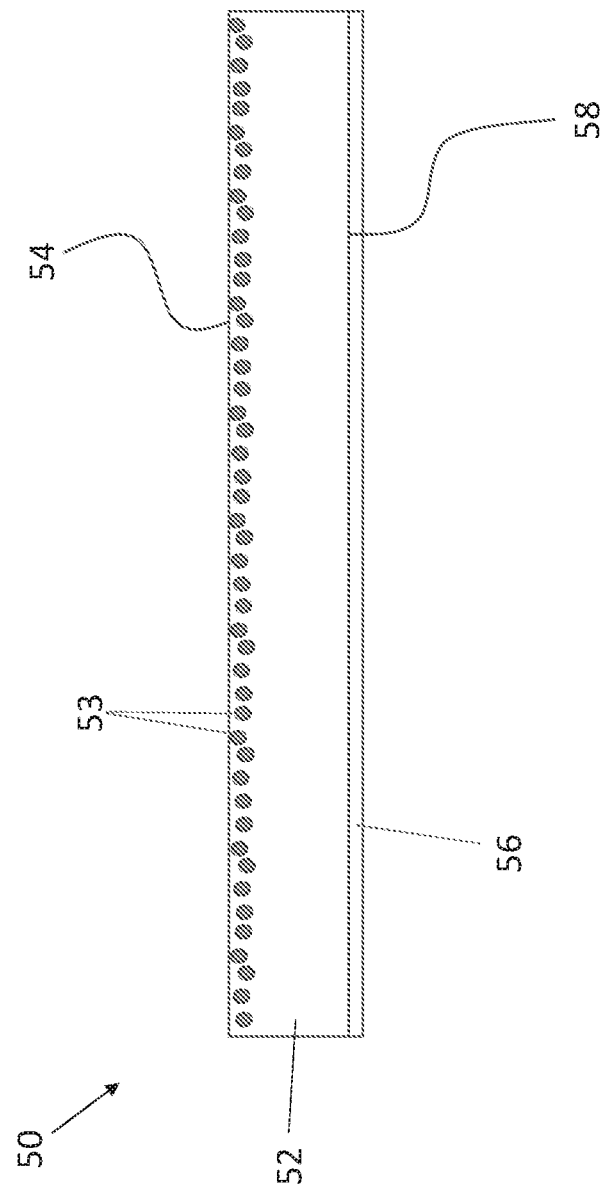

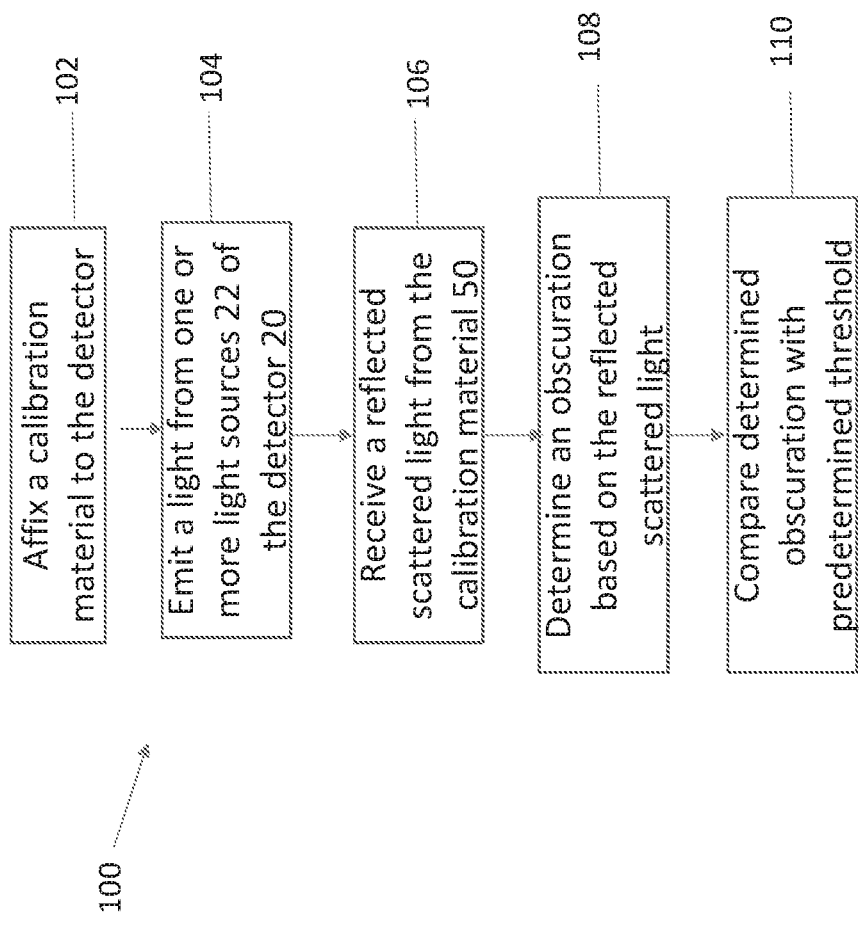

CALIBRATION OF AN OPTICAL DETECTOR

CROSS REFERENCE TO RELATED APPLICATIONS

This application is a National Stage Application of PCT/US2019/063517, filed Nov. 27, 2019, which claims priority to U.S. Provisional Application 62/778,113 filed Dec. 11, 2018, both of which are incorporated by reference in their entirety herein.

BACKGROUND

Embodiments of the present disclosure described herein generally relate to smoke detectors and, more particularly, to systems and methods for verifying operational integrity of optical smoke detectors.

Smoke detectors exist including a light source that produces and emits a light beam into an area being monitored. A photo detector is positioned to receive light that is scattered by smoke particles from the area being monitored. A processing circuit is associated with the light source and the photo detector to measure the amount of light received and evaluate whether one or more smoke particles are present.

The various components of the smoke detector contribute to the sensitivity of the detector and as a result, at the time of manufacture, the smoke detector requires calibration. Some of the main factors that lead to significant tolerance variations include the output of the LED light source and the orientation of the one or more light sources relative to the photo detector. Currently, smoke detectors are calibrated using "smoke boxes." The detector is installed within an enclosed chamber and is operated to sense the presence of the smoke surrounding the detector within the enclosure. This process is cumbersome, time consuming, and is not fully automated. Accordingly, there is a need for a system that will minimize the time required to calibrate a smoke detector.

BRIEF DESCRIPTION

According to an embodiment, a method of calibrating an optical detector includes affixing a calibration material to a first surface of the optical detector and calibrating one or more parameters of the optical detector using the calibration material.

In addition to one or more of the features described above, or as an alternative, in further embodiments calibrating one or more parameters of the optical detector further comprises emitting a light from at least one light source of the optical detector, receiving scattered light from the calibration material at one or more of light sensing devices, determining an obscuration based on the scattered light, and comparing the obscuration with one or more predetermined thresholds.

In addition to one or more of the features described above, or as an alternative, in further embodiments comprising adjusting at least one parameter of the optical detector if the obscuration is outside of the one or more predetermined thresholds.

In addition to one or more of the features described above, or as an alternative, in further embodiments comprising removing the calibration material from the optical detector if the determined obscuration is within the one or more predetermined thresholds.

In addition to one or more of the features described above, or as an alternative, in further embodiments affixing a calibration material to a first surface of the optical detector includes adhering the calibration material to the optical detector such that the calibration material is in direct contact with the first surface of the optical detector.

In addition to one or more of the features described above, or as an alternative, in further embodiments the calibration material is adhered to the optical detector with an adhesive material, and an optical path of the optical detector is free of the adhesive material.

In addition to one or more of the features described above, or as an alternative, in further embodiments affixing a calibration material to a first surface of the optical detector includes positioning the calibration material within at least one sensing volume of the optical detector.

In addition to one or more of the features described above, or as an alternative, in further embodiments the method of calibrating the optical detector occurs at any time prior to operation of the optical detector.

In addition to one or more of the features described above, or as an alternative, in further embodiments comprising removing the calibration material from the optical detector once the one or more parameters have been successfully calibrated.

In addition to one or more of the features described above, or as an alternative, in further embodiments the one or more parameters of the optical detector include operation of at least one of a light source and a light sensing device.

According to another embodiment, a calibration system includes an optical detector having a first mounting surface and a second sensing surface and a calibration material affixed to the second surface of the optical detector, wherein the calibration material has a known obscuration.

In addition to one or more of the features described above, or as an alternative, in further embodiments the known obscuration is representative of aerosolized particulates.

In addition to one or more of the features described above, or as an alternative, in further embodiments the aerosolized particulates represent a light colored smoke.

In addition to one or more of the features described above, or as an alternative, in further embodiments the aerosolized particulates represent a dark colored smoke.

In addition to one or more of the features described above, or as an alternative, in further embodiments the calibration material is a film adhered to the second surface of the optical detector.

In addition to one or more of the features described above, or as an alternative, in further embodiments the calibration material has a thickness less than 0.5 inches.

In addition to one or more of the features described above, or as an alternative, in further embodiments the calibration material has a thickness greater than 0.5 inches.

In addition to one or more of the features described above, or as an alternative, in further embodiments the calibration material includes a substrate.

In addition to one or more of the features described above, or as an alternative, in further embodiments one or more particles are provided at an exterior surface of the substrate.

In addition to one or more of the features described above, or as an alternative, in further embodiments a type, size and geometry of the one or more particles are selected to achieve the known obscuration.

In addition to one or more of the features described above, or as an alternative, in further embodiments one or more particles are distributed through the substrate.

In addition to one or more of the features described above, or as an alternative, in further embodiments an exterior surface of the substrate is processed to achieve the known obscuration.

In addition to one or more of the features described above, or as an alternative, in further embodiments an absorptive layer is applied to the exterior surface of the substrate.

In addition to one or more of the features described above, or as an alternative, in further embodiments an anti-reflective coating is applied to a surface of the substrate disposed between the substrate and the optical detector.

In addition to one or more of the features described above, or as an alternative, in further embodiments the optical detector includes at least one sensing volume, and the calibration material extends through the at least one sensing volume.

BRIEF DESCRIPTION OF THE DRAWINGS

The following descriptions should not be considered limiting in any way. With reference to the accompanying drawings, like elements are numbered alike:

FIG. 5 is a cross-sectional view of a calibration material according to an embodiment; and FIG. 6 is a method of calibrating an optical detector according to an embodiment.

DETAILED DESCRIPTION

A detailed description of one or more embodiments of the disclosed apparatus and method are presented herein by way of exemplification and not limitation with reference to the Figures.

Referring now to the FIGS., an example of an optical detector 20 for detecting one or more conditions or events within a designated area to be monitored is illustrated. In the illustrated, non-limiting embodiment, the detection apparatus 20 is a chamber-less smoke detector. It will be appreciated that a chamber-less smoke detector may provide additional benefits including, but not limited to reduction of transport time for smoke to reach the sensor elements to enable faster response/alarm times, improved sensitivity, manufacturability, and reproducibility, negligible directionality, ease of maintenance, and enhanced aesthetics for example. However, it should be understood that in other embodiments, the detector 20 may be able to detect one or more hazardous conditions, including but not limited to the presence of smoke, fire, temperature, flame, or any of a plurality of pollutants, combustion products, or chemicals. Alternatively, or in addition, the detector 20 may be configured to perform monitoring operations of people, lighting conditions, or objects. In an embodiment, the detector 20 may operate in a manner similar to a motion sensor, such as to detect the presence of a person, occupants, or unauthorized access to the designated area for example. The conditions and events described herein are intended as an example only, and other suitable conditions or events are within the scope of the disclosure.

The optical detector 20 uses light to evaluate a volume for the presence of a condition. In this example, light is emitted into the designated area being monitored; when the light encounters an object (a person, smoke particle, or gas molecule for example), the light is scattered and/or absorbed due to a difference in the refractive index of the object compared to the surrounding medium (air). Observing any changes in the incident light can provide information about the designated area including determining the presence of a predetermined condition or event.

Figure 1:
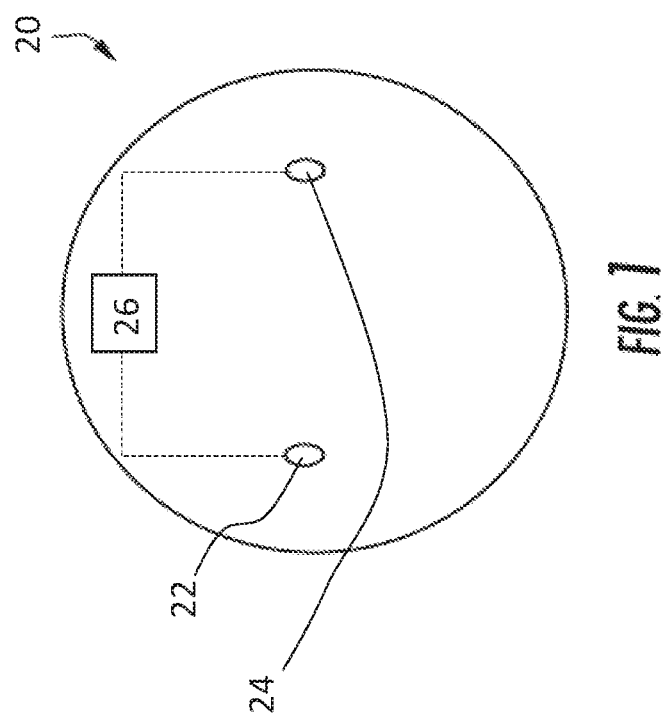
FIG. 1 is a schematic diagram of a chamberless optical detector according to an embodiment.

In its most basic form, as shown in FIG. 1, the detector 20 includes a light source 22, such as a light emitting diode (LED) for example, and a light sensing device 24, such as a photodiode for example. A processing device 26 is arranged in electrical communication with the at least one light source 22 and the at least one light sensing device 24. The processing device 26 includes a memory (not shown) capable of storing executable instructions. The executable instructions may be stored or organized in any manner and at any level of abstraction, such as in connection with one or more applications, processor, or routines, to analyze the signals detected by the plurality of sensors to make alarm decisions after preset threshold levels are reached according to the method described herein.

Figure 2:
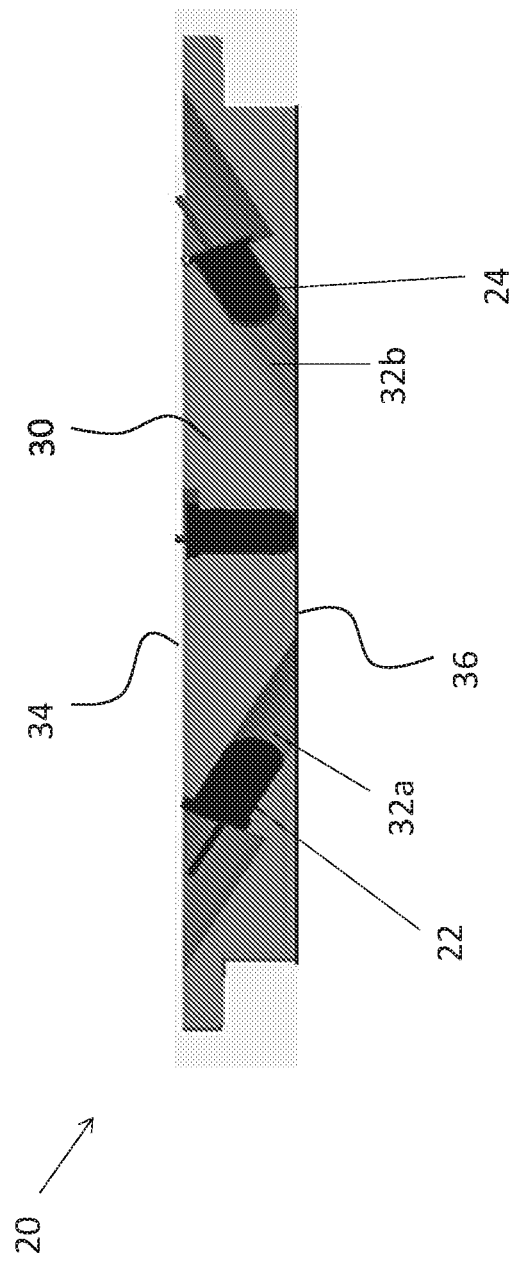
FIG. 2 is cross-sectional view of a chamberless optical detector according to an embodiment.

With reference now to FIG. 2, a cross-sectional view of the optical detector 20 is illustrated. As shown, the detector 20 further comprises a body or casing 30 having a plurality of channels 32 formed therein. The plurality of channels 32 extend generally from a first surface 34 of the body 30 to a second, opposite surface 36 of the body 30. The first surface 34 of the body 30 is typically positioned adjacent a supporting surface, such as a wall or ceiling for example, and the second surface 36 of the body 30 is typically arranged in communication with the area being monitored to determine the existence of a condition or event.

Each light source 22 may be mounted within one of the plurality of channels. In the illustrated, non-limiting embodiment, the light source 22 is mounted within a first channel 32a. Similarly, each of the one or more light sensing devices 24 is positioned within another of the plurality of channels 32 to receive light such that the portion of the at least one light sensing device 24 configured to receive a light signal is facing the second surface 36 and the area to be monitored. As shown, the light sensing device is positioned within a second channel 32b distinct from the first channel 32a containing the light source 22.

In an embodiment, the detector 20 includes a plurality of light sources 22 and/or a plurality of light sensing devices 24. In such embodiments (see FIGS. 3A-3C), the plurality of light sources 22 include at least a first light source 22a and a second light source 22b. Further, the first light source 22a and the second light source 22b may emit light at one or more wavelengths, and the one or more wavelengths may be the same, or alternatively, different. In an embodiment, the first light source 22a is configured to emit light having a wavelength associated with infrared light and the second light source 22b is configured to emit light having a wavelength associated with blue visible light.

Figure 3A:
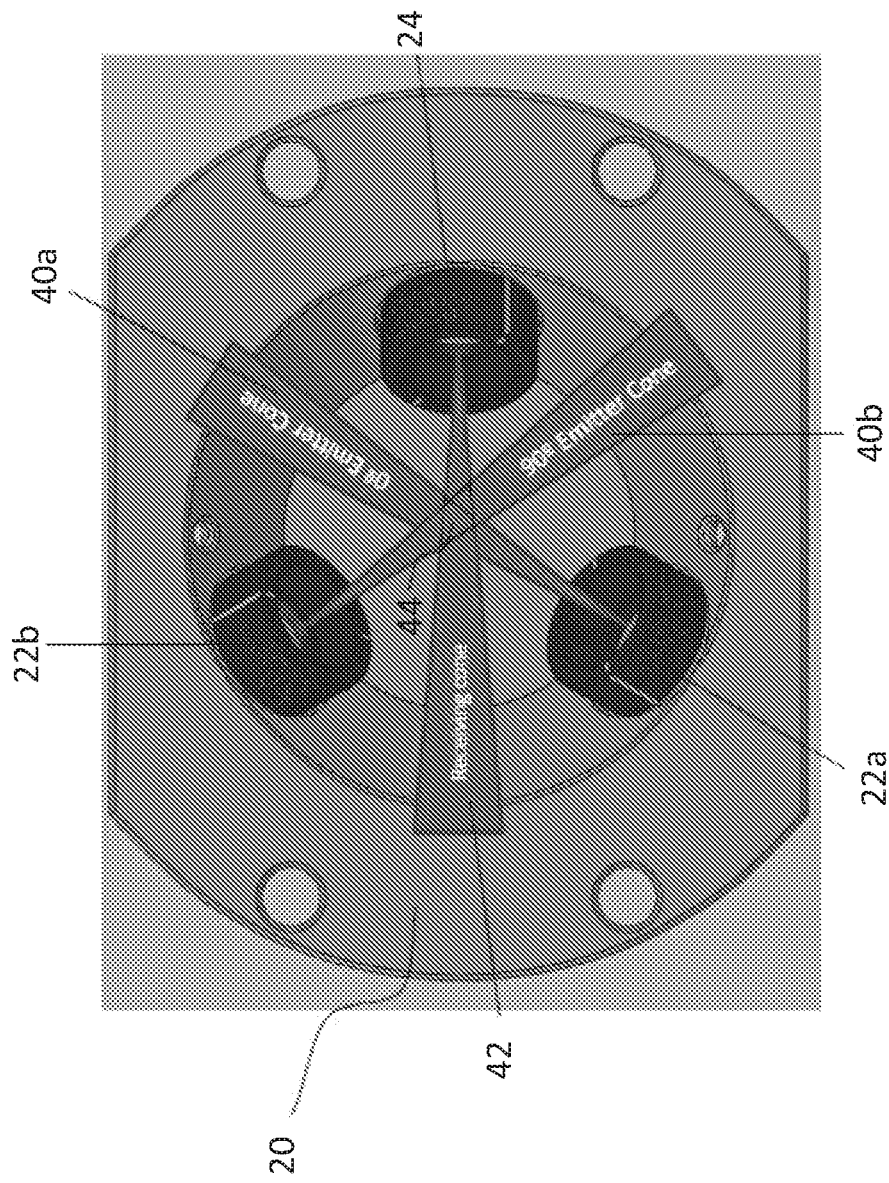
FIGS. 3A-3C are various views of the interaction between the emitter cones and receiving cones of the chamberless optical detector according to an embodiment.
Figure 3B:
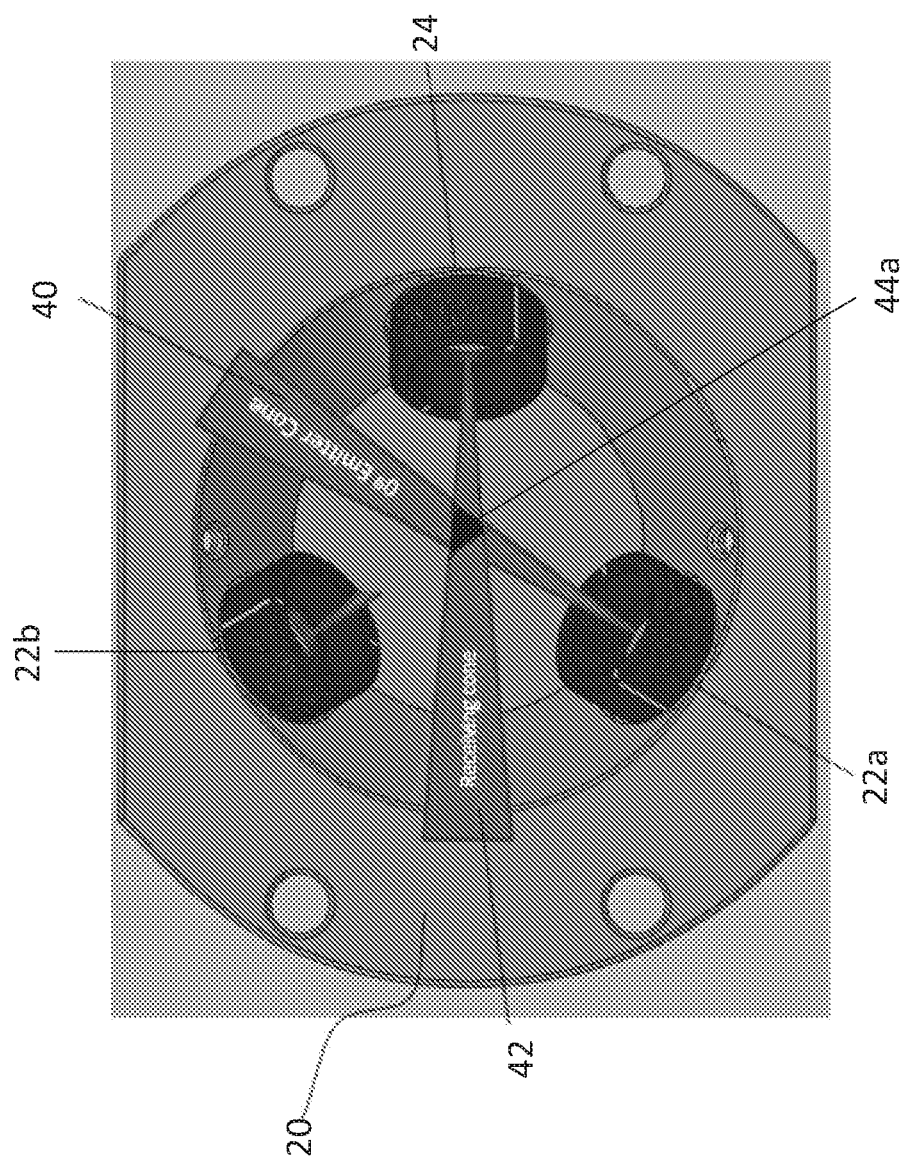
Figure 3C:
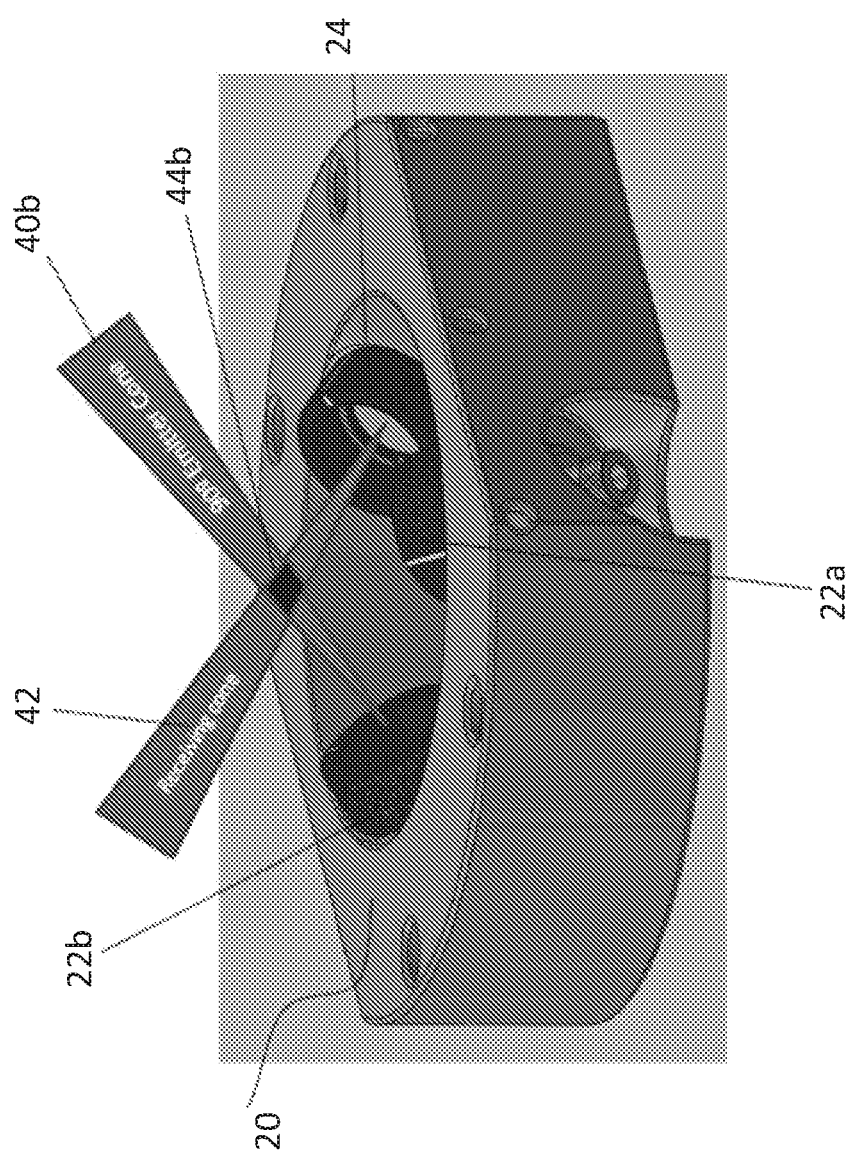

With reference to FIGS. 3A-3C, the light emitted from each of the light sources 22 defines an emitter cone 40. Accordingly, in the illustrated, non-limiting embodiment, the first light source 22a emits a first emitter cone 40a, and the second light source 22b emits a second emitter cone 40b. Each emitter cone 40 increases in diameter away from the surface 36 of the detector 20. In the illustrated, non-limiting embodiment, the first emitter cone 40a is oriented at zero degrees and the second emitter cone 40b is oriented at a position of 90 degrees relative to the first emitter cone 40a. However, it should be understood that any suitable angle between the first and second emitter cones 40a, 40b is within the scope of the disclosure. The at least one light sensing device 24 similarly has a receiving cone 42 associated therewith. Further, the volume where each emitting cone 40 overlaps with the receiving cone 42 is defined as a sensing volume 44. In the illustrated, non-limiting embodiment, a first sensing volume 44a is defined between the first emitter cone 40a and the receiving cone 42 and a second sensing volume 44b is defined between the second emitter cone 40b and the receiving cone 42.

An example of a detector 20 as illustrated and described herein and a method of operating the detector 20 to detect the presence of a condition or event, such as smoke for example, is set forth in more detail in U.S. Provisional Patent Application Ser. No. 62/397,972 filed on Sep. 22, 2106, the entire contents of which is included herein by reference.

Figure 4:
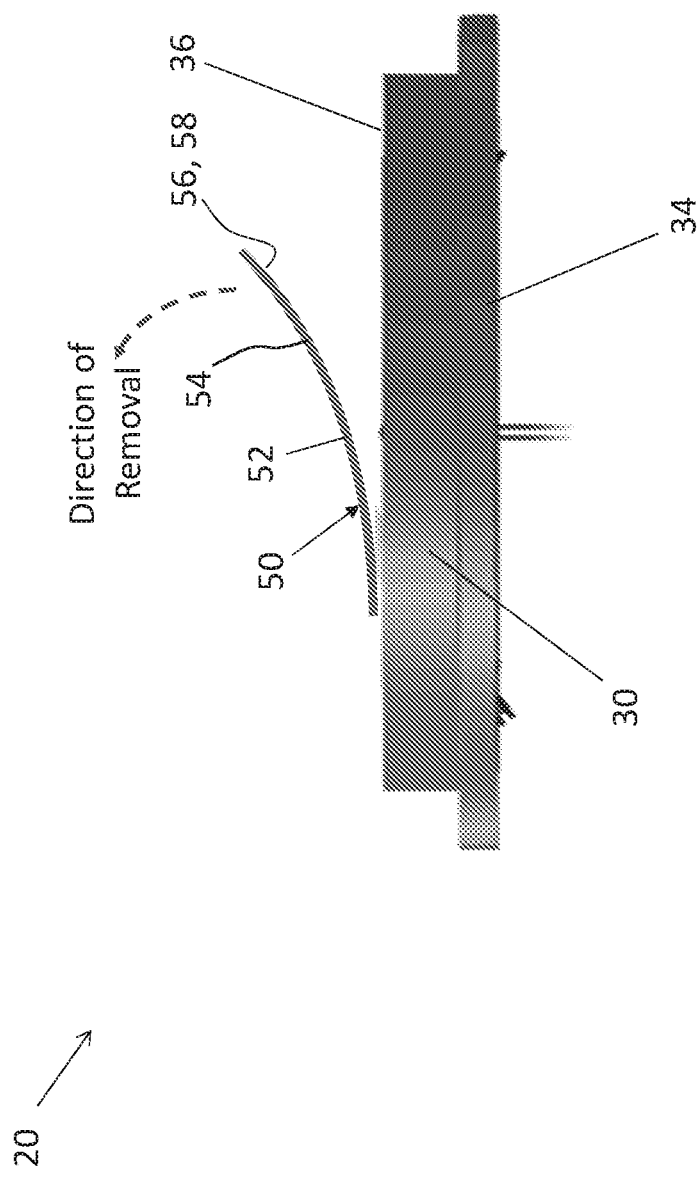
FIG. 4 is a side view of an optical detector including a calibration material according to an embodiment.

With reference now to FIG. 4, an example of a calibration material 50 for evaluating the operational sensitivity of a detector, such as detector 20 for example, is illustrated. The calibration material 50 may be applied to the surface of the detector 20 during the manufacture of the detector 20, or alternatively, may be applied after the manufacture of the detector 20 is complete. In the illustrated, non-limiting embodiment, the calibration material 50 is a film or sticker affixed to the surface 36 of the detector 20, such as with an adhesive for example. In such embodiments, the optical path defined by the light source 22 and the light sensing device 24 remains free from an adhesive material. In an embodiment, the calibration material 50 has a thickness of approximately 0.5 inches or less. In other embodiments, the calibration material 50 may have a thickness between about 0.5 inches and 1 inch, and in some embodiments between about 0.5 inches and about 6 inches, and between about 1 inch and 6 inches.

As best shown in FIG. 5, the calibration material 50 is an engineered material including a body 52 formed from a transparent material or substrate. In an embodiment, a plurality of engineered particles 53 are provided at a first, exterior surface 54 of the substrate 52. Although the plurality of engineered particles 53 are illustrated and described herein as being arranged adjacent the exterior surface of the material body, in other embodiments, the plurality of engineered particles may be substantially equally distributed throughout the material body 52.

Alternatively or in addition, a process, such as roughening or etching for example, may be applied to the exterior surface 54, and/or an optically absorbing layer or paint may be applied to the exterior surface 54 of the calibration material 50. Inclusion of an absorptive layer on the exterior surface 54 may prevent ambient light from entering into the calibration material 50, and also may prevent reflection of light emitted from the light source 22, thereby reducing noise.

The overall configuration of the calibration material 50 is selected to achieve at least one of a predetermined diffuse reflection, specular reflection, and scattering properties. In an embodiment, one or more parameters of the calibration material 50 are selected to achieve desired light scattering properties, also referred to herein as an "obscuration," representative of the presence of aerosolized particulates. Examples of aerosolized particulates include, but are not limited to, smoke, pollen, dust, PM2.5 particulates, and microbials for example. In an embodiment, one or more parameters of the calibration material 50 are selected to achieve an obscuration representative of the presence of a light colored smoke. In another embodiment, one or more parameters of the calibration material 50 are selected to achieve an obscuration representative of the presence of a dark colored smoke.

One or more coatings 56 may be applied to a portion of the calibration material. In the illustrated, non-limiting embodiment, best shown in FIG. 5, an anti-reflective coating 56 is applied to a surface of the calibration material 50. As shown, the primary surface 58 of the calibration material 50, which is the surface configured to contact the surface 36 of the detector 20, includes a coating 56. Application of the anti-reflective coating to the primary surface 58 is operable to limit the reflection of light emitted from the light sources 22 of the detector at the surface 58.

With reference now to FIG. 6, a method 100 of calibrating one or more parameters of a detector, such as detector 20, using the calibration material 50 is provided. In step 102, a calibration material 50 is affixed to the surface 36 of the detector 20, such as with an adhesive for example. In an embodiment, the calibration material 50 is affixed to the surface 36 of the detector 20 during the manufacture of the detector 20. Once the calibration material 50 is attached to the detector 20, calibration of the detector 20 may be performed at any location and at any time prior to operation of the detector 20. Calibration is typically performed before installation of the detector 20. In an embodiment, calibration of the detector 20 is performed at a calibration station of the production or manufacturing line. In such embodiments, calibration of the detector 20 occurs downstream or after the calibration material 50 is affixed to the detector 20 with respect to the manufacturing process. However, it should be understood that one or more steps of the method of calibrating a detector 20 need not be performed during manufacture of the detector. For example, in some embodiments calibration may be performed during installation, or alternatively, right after installation and prior to operation of the detector 20.

In step 104, the detector 20 is operated such that at least one light source 22 within the detector 20 emits one or more pulses of light. The one or more pulses of light scatter as they pass through the calibration material 50. In step 106, the scattered light is received by at least one light sensing device 24 of the detector 20 and in step 108, the scattered light received by the at least one light sensing device 24 of the detector 20 is processed by a processing device 26. If the processing device 26 determines a level of obscuration corresponding to a known obscuration associated with the calibration material 50, then the detector 20 may be considered calibrated. In an embodiment, the detector 20 may be considered "calibrated" if the level of obscuration identified by the processing device 26 of the detector 20 is within one or more predetermined thresholds associated with the obscuration of the calibration material (step 110). Multiple thresholds may be used during the calibration process, for example representing a maximum threshold and a minimum threshold. In such embodiments, the obscuration identified by the processing device 26 of the detector 20 must be within the range defined by at least one of the thresholds to account for manufacturing tolerances.

If the level of obscuration identified by the processing device 26 is outside of the predetermined thresholds, one or more parameters of the processing device 26 are adjusted and the steps indicated in blocks 104-110 may be repeated until the level of obscuration is within the allowable threshold. After one or more parameters of the detector 20 have been successfully calibrated, the calibration material 50 may be removed therefrom.

Examples of one or more parameters that may be adjusted include the light output intensity of the light sources 22, the detector sensitivity, the electronic gain of the circuitry associated with the light sensing device 24, and the scaling factor associated with the responsivity of the light sensitive device 24. Further, it should be understood that the calibration method illustrated and described herein may be used to calibrate the one or more optical elements, i.e. light source 22 or light sensing device 24, to respond within a tolerance to the respective optical elements of a reference detector.

Application of a calibration material 50 during manufacture of the detector allows for calibration of the detector 20 starting from the manufacturing line to moments before operation. Use of the sticker-like calibration material reduces the risk of installed defective detectors. In addition, the sticker-like calibration materials will be reproducible, low cost and disposable, and thus calibration will be more efficient compared to existing calibration processes using gaseous materials.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of calibrating an optical detector comprising:
   affixing a calibration material to a first surface of the optical detector; and
   calibrating one or more parameters of the optical detector using the calibration material, wherein calibrating one or more parameters of the optical detector further comprises:
   emitting a light from at least one light source of the optical detector;
   receiving scattered light from the calibration material at one or more of light sensing devices;
   determining an obscuration based on the scattered light;
   comparing the obscuration with one or more predetermined thresholds; and
   adjusting at least one parameter of the optical detector if the obscuration is outside of the one or more predetermined thresholds.

2. The method of claim 1, further comprising removing the calibration material from the optical detector if the determined obscuration is within the one or more predetermined thresholds.

3. The method of claim 1, wherein affixing a calibration material to a first surface of the optical detector includes adhering the calibration material to the optical detector such that the calibration material is in direct contact with the first surface of the optical detector.

4. The method of claim 3, wherein the calibration material is adhered to the optical detector with an adhesive material, and an optical path of the optical detector is free of the adhesive material.

5. The method of claim 1, wherein affixing a calibration material to a first surface of the optical detector includes positioning the calibration material within at least one sensing volume of the optical detector.

6. The method of claim 1, wherein the method of calibrating the optical detector occurs at any time prior to operation of the optical detector.

7. The method of claim 1, further comprising removing the calibration material from the optical detector once the one or more parameters have been successfully calibrated.

8. The method of claim 1, wherein the one or more parameters of the optical detector include operation of at least one of a light source and a light sensing device.

9. A calibration system comprising:
   an optical detector having a first mounting surface and a second sensing surface; and
   a calibration material affixed to the second surface of the optical detector, wherein the calibration material has a known obscuration and includes a substrate; and
   an anti-reflective coating is applied to a surface of the substrate disposed between the substrate and the optical detector.

10. The calibration system of claim 9, wherein the known obscuration is representative of aerosolized particulates.

11. The calibration system of claim 9, wherein the calibration material is a film adhered to the second surface of the optical detector.

12. The calibration system of claim 9, wherein one or more particles are provided at an exterior surface of the substrate.

13. The calibration system of claim 9, wherein one or more particles are distributed through the substrate.

14. The calibration system of claim 9, wherein an exterior surface of the substrate is processed to achieve the known obscuration.

15. The calibration system of claim 14, wherein an absorptive layer is applied to the exterior surface of the substrate.

16. The calibration system of claim 9, wherein the optical detector includes at least one sensing volume, and the calibration material extends through the at least one sensing volume.

17. A method of calibrating an optical detector comprising:
   affixing a calibration material to a first surface of the optical detector, wherein affixing the calibration material to the first surface of the optical detector further comprises adhering the calibration material to the optical detector such that the calibration material is in direct contact with the first surface of the optical detector; and calibrating one or more parameters of the optical detector using the calibration material.

18. A calibration system comprising:

an optical detector having a first mounting surface and a second sensing surface; and a calibration material affixed to the second surface of the optical detector, wherein the calibration material has a known obscuration and includes a substrate; and an absorptive layer is applied to the exterior surface of the substrate, wherein an exterior surface of the substrate is processed to achieve a known obscuration.

\* \* \* \* \*